(12) United States Patent
Norris

(10) Patent No.: US 9,864,081 B2
(45) Date of Patent: Jan. 9, 2018

(54) CABLE HEAD MARINE SEISMIC SOURCE

(71) Applicant: Michael W. Norris, Cypress, TX (US)

(72) Inventor: Michael W. Norris, Cypress, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 176 days.

(21) Appl. No.: 14/862,203

(22) Filed: Sep. 23, 2015

(65) Prior Publication Data

US 2016/0131778 A1 May 12, 2016

Related U.S. Application Data

(60) Provisional application No. 62/078,227, filed on Nov. 11, 2014.

(51) Int. Cl.
*G01V 1/38* (2006.01)
*G01V 1/20* (2006.01)

(52) U.S. Cl.
CPC .......... *G01V 1/201* (2013.01); *G01V 1/3808* (2013.01); *G01V 1/3817* (2013.01); *G01V 2001/207* (2013.01)

(58) Field of Classification Search
CPC ........ G01V 1/3861; G01V 1/006; G01V 1/38; G01V 1/3808; G01V 1/201
USPC ...................................... 367/23, 15
See application file for complete search history.

(56) References Cited

U.S. PATENT DOCUMENTS

| | | | |
|---|---|---|---|
| 3,744,021 A | 7/1973 | Todd | |
| 5,058,080 A | 10/1991 | Siems et al. | |
| 6,229,760 B1 | 5/2001 | Ambs | |
| 6,556,510 B2 | 4/2003 | Ambs | |
| 6,839,302 B2 | 1/2005 | Austad et al. | |
| 7,512,036 B2 | 3/2009 | Crowell | |
| 7,701,803 B2 | 4/2010 | Welker | |
| 8,004,930 B2 | 8/2011 | Welker et al. | |
| 8,467,264 B2 | 6/2013 | Keers et al. | |
| 8,792,297 B2 | 7/2014 | Hillesund et al. | |
| 8,958,266 B2 | 2/2015 | Kragh et al. | |
| 8,964,502 B2 | 2/2015 | Norris | |
| 9,013,953 B2 | 4/2015 | Brizard | |

(Continued)

FOREIGN PATENT DOCUMENTS

| | | |
|---|---|---|
| EP | 0 018 053 A1 | 10/1980 |
| GB | 2 172 997 A | 10/1986 |

OTHER PUBLICATIONS

Annonymous, "HMS-620 Bubble Gun Family," XP055237905, retrieved from: http://www.falmouth.com/systems/bubblegunseismicsystems.html, 1 pg. (May 20, 2015).

*Primary Examiner* — Ian J Lobo

(74) *Attorney, Agent, or Firm* — ExxonMobil Upstream Research Company—Law Department

(57) ABSTRACT

Method for obtaining zero offset or near zero offset data in a marine seismic streamer survey. An acoustic transmitter (41) is attached to one of the buoys (14 or 16) that provide flotation to each streamer (12) and tow umbilical (13). The acoustic transmitters, or single transmitter in the case of a 2-D survey, may be fired (71-73) before each shot from the survey air guns. The response to the acoustic transmitters recorded by the near sensors in each streamer, or by a water break sensor if provided, will be a near-zero to zero-offset record of the shallow subsurface below the water bottom.

18 Claims, 7 Drawing Sheets

(56) References Cited

U.S. PATENT DOCUMENTS

| | | |
|---|---|---|
| 2004/0240319 A1 | 12/2004 | Carvill et al. |
| 2009/0231953 A1 | 9/2009 | Welker et al. |
| 2014/0153360 A1* | 6/2014 | Tonchia .................. G01V 1/38 367/19 |
| 2014/0241123 A1 | 8/2014 | Sallas et al. |
| 2014/0301163 A1 | 10/2014 | Welker |
| 2015/0260861 A1* | 9/2015 | L'Her .................... G01V 1/001 367/13 |

* cited by examiner

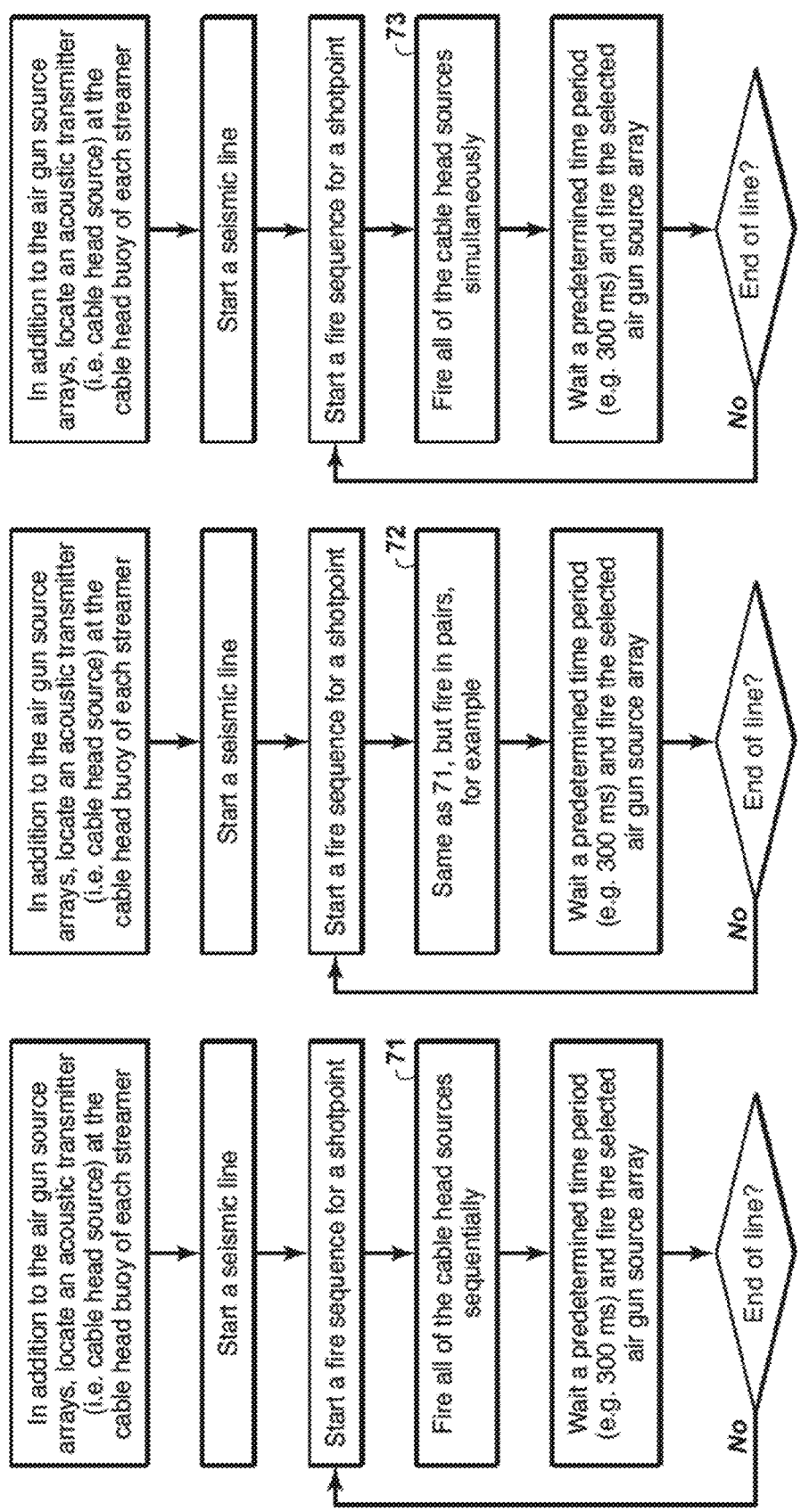

CABLE HEAD MARINE SEISMIC SOURCE

CROSS-REFERENCE TO RELATED APPLICATION

This application claims the benefit of U.S. Provisional Patent Application 62/078,227 filed Nov. 11, 2014 entitled CABLE HEAD MARINE SEISMIC SOURCE, the entirety of which is incorporated by reference herein.

FIELD OF THE INVENTION

This disclosure relates generally to the field of geophysical prospecting for hydrocarbons and, more particularly, to 2D or 3D marine seismic surveying and processing of the measured data. Specifically the disclosure relates to a method for generating near-zero offset traces by placing an acoustic transmitter on one or more of the buoys that provide flotation for the streamers and their umbilicals.

BACKGROUND

In many shallow water environments, the near-surface geology is highly complex and the near-surface geology contains significant horizontal inhomogeneities. The effects of near-surface complexity and horizontal inhomogeneities can be commonly observed in seismic data acquired in shallow water, marine environments near river outlets and in the Arctic. The near-surface complexity and lateral variability in these areas introduce significant multiples and local lateral velocity anomalies in the seismic data. This complexity and lateral variability degrade a seismic image. Energy contained in the multiples obscures deeper reflection energy. Local lateral velocity anomalies defocus imaged reflectors. To improve the seismic image, the multiple generators need to be identified and local velocity variations need to be characterized. For the seismic data to identify the origins of the multiple generators and sample the local velocity variations, it needs to contain zero-offset data and near zero-offset data (i.e. small-opening-angle data). Small-opening-angle data provide the best timing estimates and the least phase uncertainty for reflection data and for the associated multiple events. Better timing estimates and reduced phase uncertainty benefit inversion and demultiple algorithms in shallow water environments by constraining the solutions with pre-critical-angle reflection data. It will typically be sufficient if these small opening angle data are obtained only from a near-surface portion of the subsurface.

FIG. 1 shows a plan view of a typical hardware layout used for 3D marine acquisition. This hardware example uses two source arrays 11, which will typically but not necessarily be air guns, and eight seismic streamers 12 to create sixteen tracks of seismic data with each pass of the vessel over the survey area. Seismic sensor sets (not shown), typically hydrophones, are spaced along the length of each streamer. Each seismic streamer is connected to the vessel via an umbilical 13 that provides power to the streamer and telemetry signals to and from the seismic sensor sets. Because of the need to pull the streamer through the water, the umbilical is constructed of materials capable of many thousands of pounds of bollard pull. A consequence of the umbilical's strength is that it is very heavy and has a significant in-water weight which is typically tens of kilograms per meter. To support this heavy weight, a buoy 14—called a cable head buoy—is located at the head of each streamer. The motion of the streamer umbilical and cable head buoy is decoupled from the streamer by vibration isolation module(s) 15, which attenuate longitudinal traveling energy. Because of the towing arrangement and the need to attenuate longitudinal traveling energy, the distance between the source and the nearest receiver is typically 100 m to 150 m for conventional marine, seismic data acquisition. For seismic data acquisition in water depths that are large compared to the minimum source-receiver distance, e.g. greater than approximately 300 m, this minimum source to receiver separation does not preclude the acquisition of small-opening-angle data. In more shallow water depths, however, virtually no data with small opening angles will be acquired.

Other typical hardware features shown in FIG. 1 include the cable tail buoys 16 and the air gun umbilicals 17. Typical dimensions are 250 m from the navigation point 18 to the center of the air gun array, then 125 m to the cable head boys, then another 25 m to the center of the first group of sensors (not shown), with the streamers being separated by 50 m spacing.

This deficiency in shallow marine data has been recognized by the seismic industry for a long time. U.S. Pat. No. 3,744,021 to Todd describes a method for simultaneously acquiring deep and shallow reflection data along a common profile line. U.S. Pat. No. 8,467,264 to Keers describes the use of mini-streamers associated with the air gun sources to acquire near-zero offset data. U.S. Pat. No. 8,958,266, issued from Patent application publication 2010/0002539 by Kragh, and U.S. Pat. No. 8,964,502, issued from Patent application publication 2011/0063947 by Norris, describe methods of extracting zero-offset data from near-field hydrophones located within the air gun source array. All of these methods for obtaining zero-offset and near zero-offset seismic data define one or at most a few seismic profiles for each pass of the seismic vessel over the survey area. In the cases where a few seismic profiles are created, all of these seismic profiles define tracks that are directly beneath the air gun source arrays or tracks that are immediately adjacent to the path of the air gun source arrays. The information generated by these seismic profiles is useful for improving 2D seismic data but improvements to 3D data are limited by the significant spacing of the tracks in a crossline direction. Typically for 3D seismic acquisition, this crossline spacing can be from 400 m to 1000 m. In other words, when the tow vessel in FIG. 1 turns and comes back along the next survey line, the spacing between that sail line and the previous sail line will typically be 400 m to 1000 m.

To improve 3D data using the near-surface information, a high resolution, near-surface track of data needs to be created for each seismic streamer for each pass of the seismic vessel over the survey area. This need is spoken to by U.S. Pat. No. 6,556,510 to Ambs. Ambs's approach is to place lightweight, energy efficient acoustic energy sources throughout a seismic receiver array. This approach is applicable for the purposes of streamer location as described by Ambs, U.S. Pat. No. 6,229,760, and Austad, U.S. Pat. No. 6,839,302, but acoustic sources that are capable of being embedded within a streamer cable are inherently small, low power sources and operate at frequencies well above the typical seismic frequency band of 2 Hz to 150 Hz. Consequently, the signals this type of acoustic source can generate do not penetrate the earths subsurface or their depth of penetration is limited to the first few centimeters of the earth's subsurface. This limit on the depth of penetration does not provide the data needed to identify the origins of multiple generators or to characterize the local, subsurface velocity variations. What is needed is an acquisition method that penetrates into the first 300 m to 500 m of the earth's subsurface and provides a high resolution image of the subsurface along the track of every streamer in the seismic receiver spread.

SUMMARY

Placing a small, low power acoustic transmitter 41 at each cable head buoy 14, see FIG. 5, in a marine seismic spread allows high resolution, near-surface, common shot gathers to be acquired along the tow-track of each seismic streamer. Because depth of penetration is highly dependent on the bottom and subsurface conditions, it is difficult to state a penetration requirement such as 300 m to 500 m in terms of source strength, but a reasonable expectation is that a source for near-surface imaging would need a peak pressure of 300 to 500 millibars for a frequency band from 10 Hz to 2000 Hz. A small air gun, 20 to 40 ci, will have a peak pressure in the range of a few bars over this frequency range, and thus would easily meet these power specifications. However, to place an air gun at each cable head buoy would require transmitting high pressure air, ~2000 psi, over very long distances, typically 600 m or more, which would be difficult to do.

Besides an air gun, possible sources for the present invention are electrical devices, for example a sparker, boomer, or piezoelectric stack, or chemical devices such as explosives. Sparkers do not have stable source signatures for more than a few thousand shots. Boomers lack low-frequency content. Piezoelectric stacks would require a very significant voltage to create a signal with sufficient subsurface penetration. Explosives have significant handling and safety issues. A currently preferred source for the present invention is the Falmouth Bubble Gun, which is a pair of electromagnet plates with an air spring between the plates. The electromagnets are energized to compress the air spring, and then the current is removed and the spring expands the plates outward. Internally it runs on DC power.

The common shot gathers may be generated at a shot interval that is equal to or shorter than the shot interval used for the seismic air gun arrays. An example of such a high resolution, near-surface, common shot gather is shown in FIG. 2. Unlike the previous methods of acquiring zero-offset and near zero-offset data, i.e. Todd, Kerr, Kragh and Norris, acquiring seismic data with the conventional air gun arrays and with a Cable Head Source 41 at the head of each seismic cable 12 allows the collection of near-surface data at a relatively fine crossline spatial interval (i.e. typically 50 m). Additionally the tracks of the near-surface data closely follow the tracks associated with the conventional seismic data generated by each streamer and the air gun arrays. Unlike Ambs's implementation, the acoustic transmitter may have sufficient power and frequency content to penetrate several hundred meters into the earth's subsurface as is illustrated by the common shot gather shown in FIG. 2, which are actual test data from the present invention. The source used was Falmouth Scientific's Low Frequency Bubble Gun. The sensors were vertical accelerometers on the surface of the ground. The accelerometers started at the edge of the test pond and went in a straight line away from the pond.

The cable head buoy is designed to support thousands of pounds of weight which allows an acoustic transmitter to be large enough to generate low frequency, 20 to 100 Hz, energy. An acoustic transmitter capable of penetration several hundred meters into the subsurface can be expected to weigh several hundred pounds. Without adding additional buoyance to a streamer cable, an in-cable acoustic transmitter such as Ambs used can only weigh a few pounds if its weight is to be supported by the streamer cable buoyancy. Adding addition external buoyancy to a streamer cable would allow a more powerful acoustic transmitter to be placed in the streamer cable but the additional external buoyance would also significantly increase the noise generated into the sensor sets, as is evidenced by in-cable acoustic transmitters currently sometimes used to locate the streamers (i.e. for navigation purposes), which transmitters with their associated buoyancy create very significant amounts of noise into their sensor sets.

As explained previously, near-surface zero-offset data for each streamer allows the seismic data to be processed more accurately. Among the benefits of this are removal of multiple reflections from the seismic data, and generating subsurface models of velocity or other physical properties by inverting the seismic data. Both of these techniques are highly useful in prospecting for hydrocarbon deposits.

In one embodiment, the invention is a method for acquiring near zero-offset seismic data in a marine streamer seismic survey with at least one seismic source and one or more streamers, each streamer attached to at least one buoy to provide flotation, said method comprising: (a) placing an acoustic transmitter at one buoy on at least one of the streamers, wherein each acoustic transmitter transmits an acoustic signal strong enough to penetrate beneath the water bottom at least 300 m into the subsurface; (b) firing the at least one acoustic transmitter; and (c) obtaining near zero-offset data from one or more streamer sensors nearest the at least one acoustic transmitter.

BRIEF DESCRIPTION OF THE DRAWINGS

The advantages of the present invention are better understood by referring to the following detailed description and the attached drawings, in which:

FIGS. 7A-7C are flow charts showing basic steps in three embodiments of the present inventive method for seismic data acquisition using Cable Head Source(s) with conventional marine seismic acquisition hardware (i.e. the hardware shown in FIG. 1).

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION

Once a cable head buoy and its umbilical are in the water and part of the seismic spread, it is difficult and time consuming to retrieve the cable head buoy and its associated streamer. Consequently, an acoustic transmitter that is placed at the cable head buoy needs to have a stable source signature, be very reliable, be relatively small, have relatively low power requirements and be electrically powered. An acoustic transmitter that meets these requirements can be powered with the electrical power supplied by the umbilical, controlled with the telemetry paths inherent in the umbilical and is capable of remaining in the water for the duration of the seismic survey. Falmouth Scientific's Bubble Gun is an example of such an acoustic transmitter (internet domain name: falmouth.com).

Figure 1:
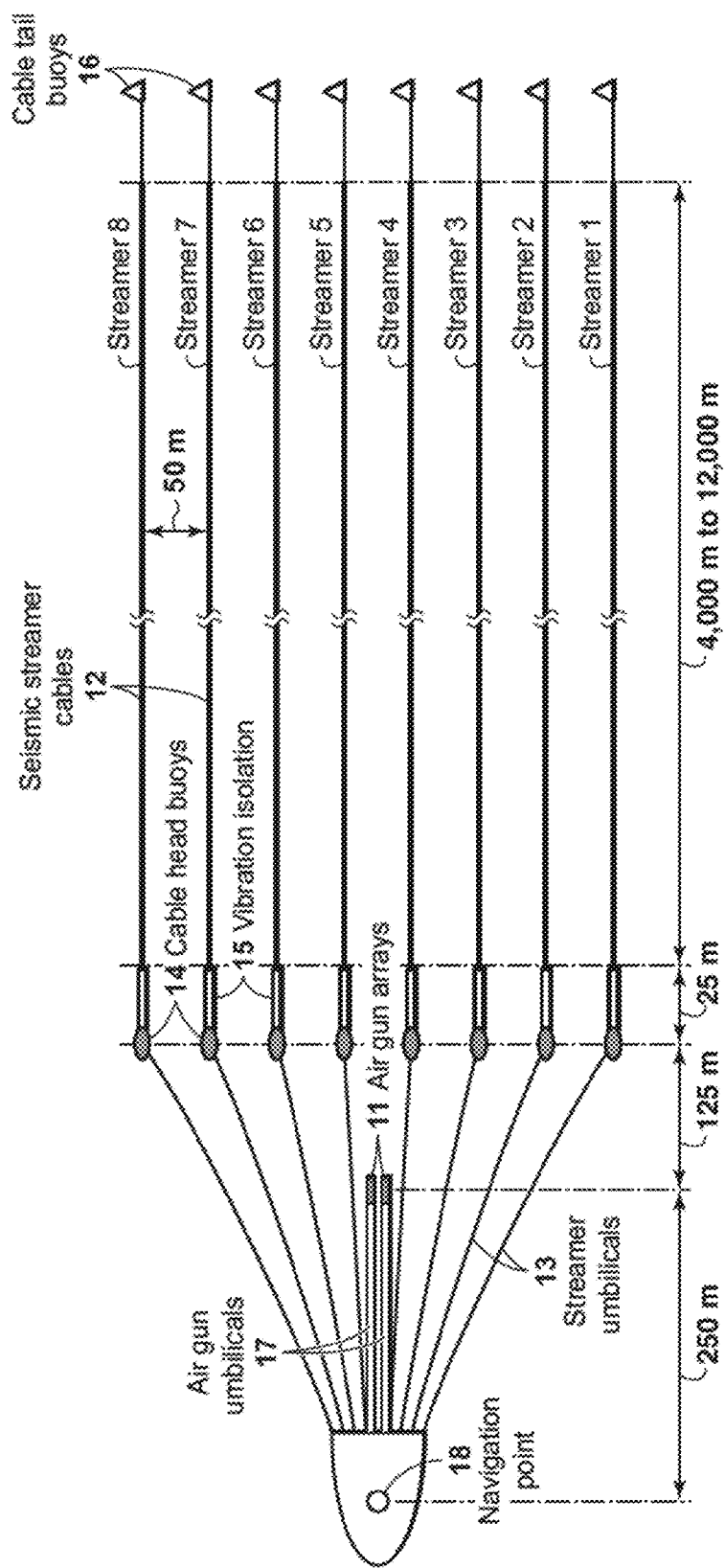
FIG. 1 is a schematic plan view of the in-sea hardware used for conventional 3D marine seismic data acquisition.
Figure 2:
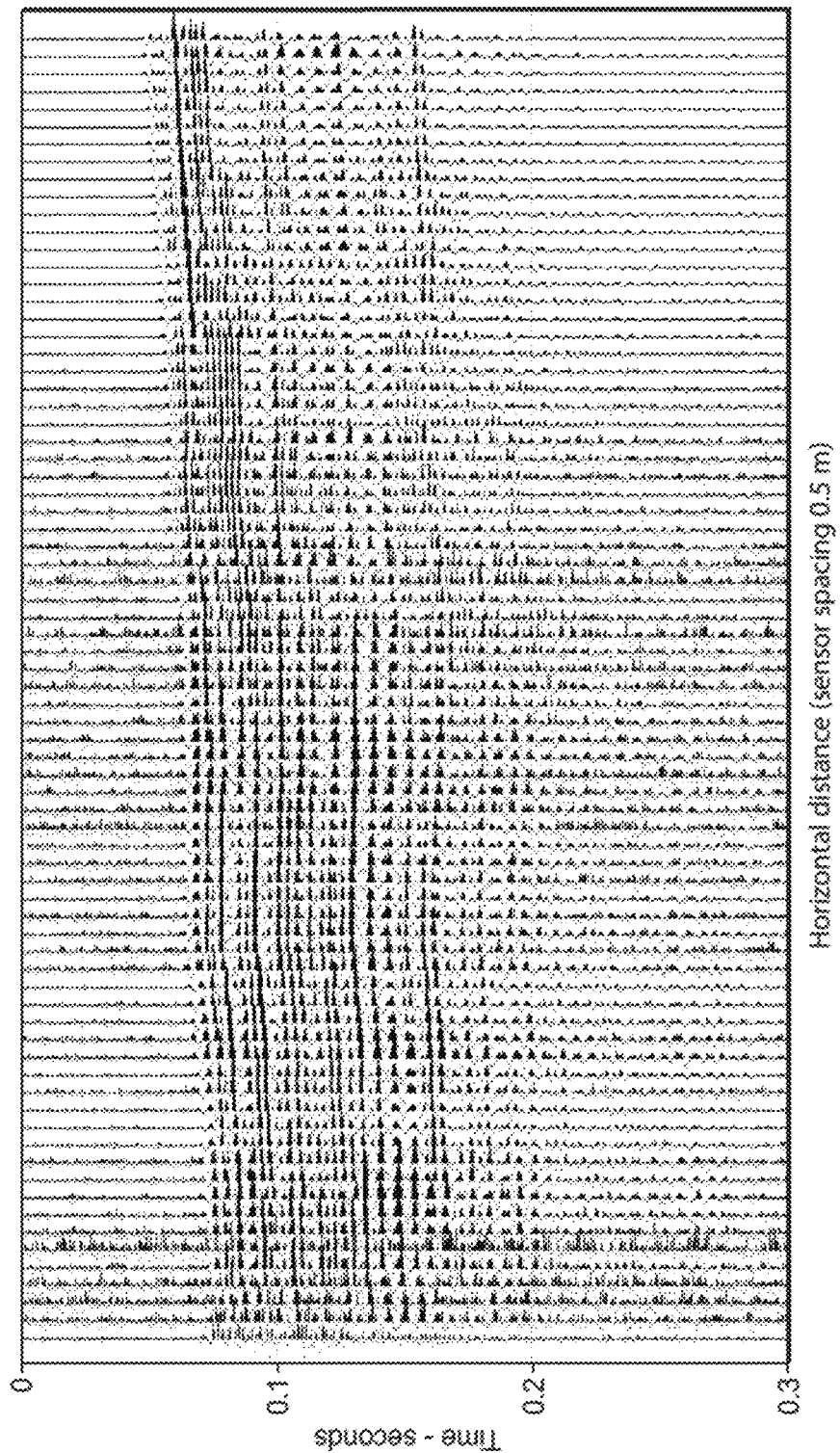
FIG. 2 is a high resolution image of the very near surface provided by data recording of responses to a cable head buoy source deployed in a system of the present invention.
Figure 3:
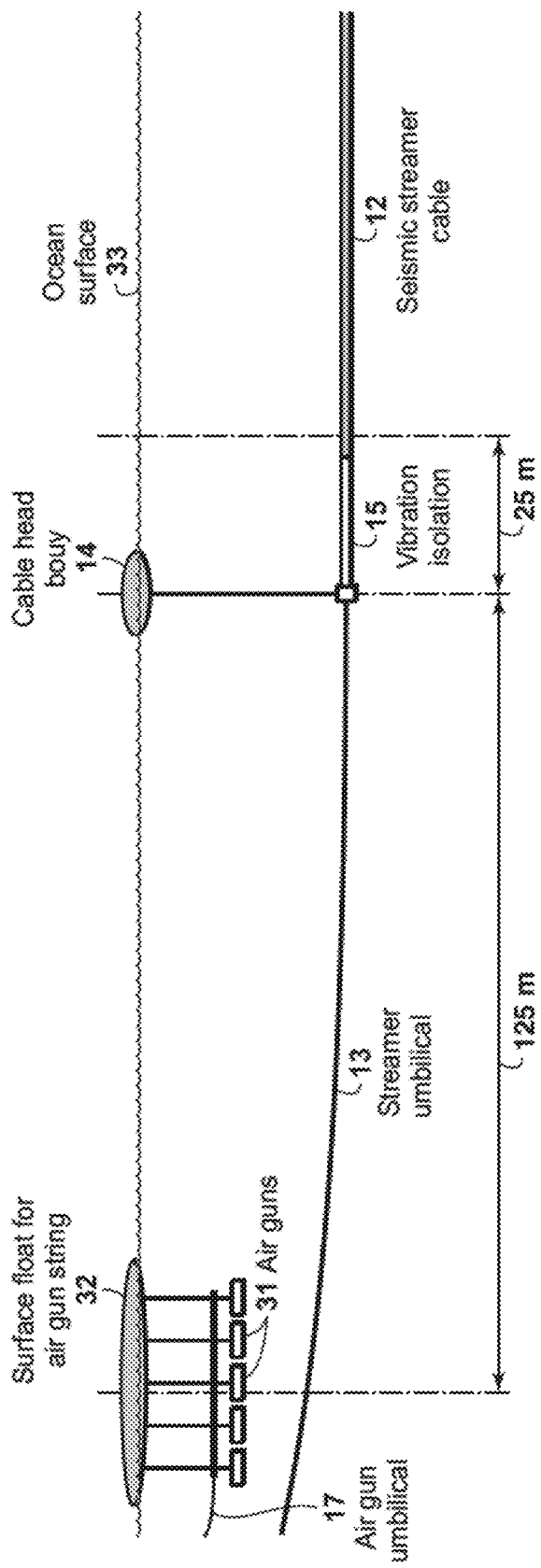
FIG. 3 is a schematic cross-section view of in-sea hardware used for conventional 3D, marine seismic data acquisition.
Figure 4:
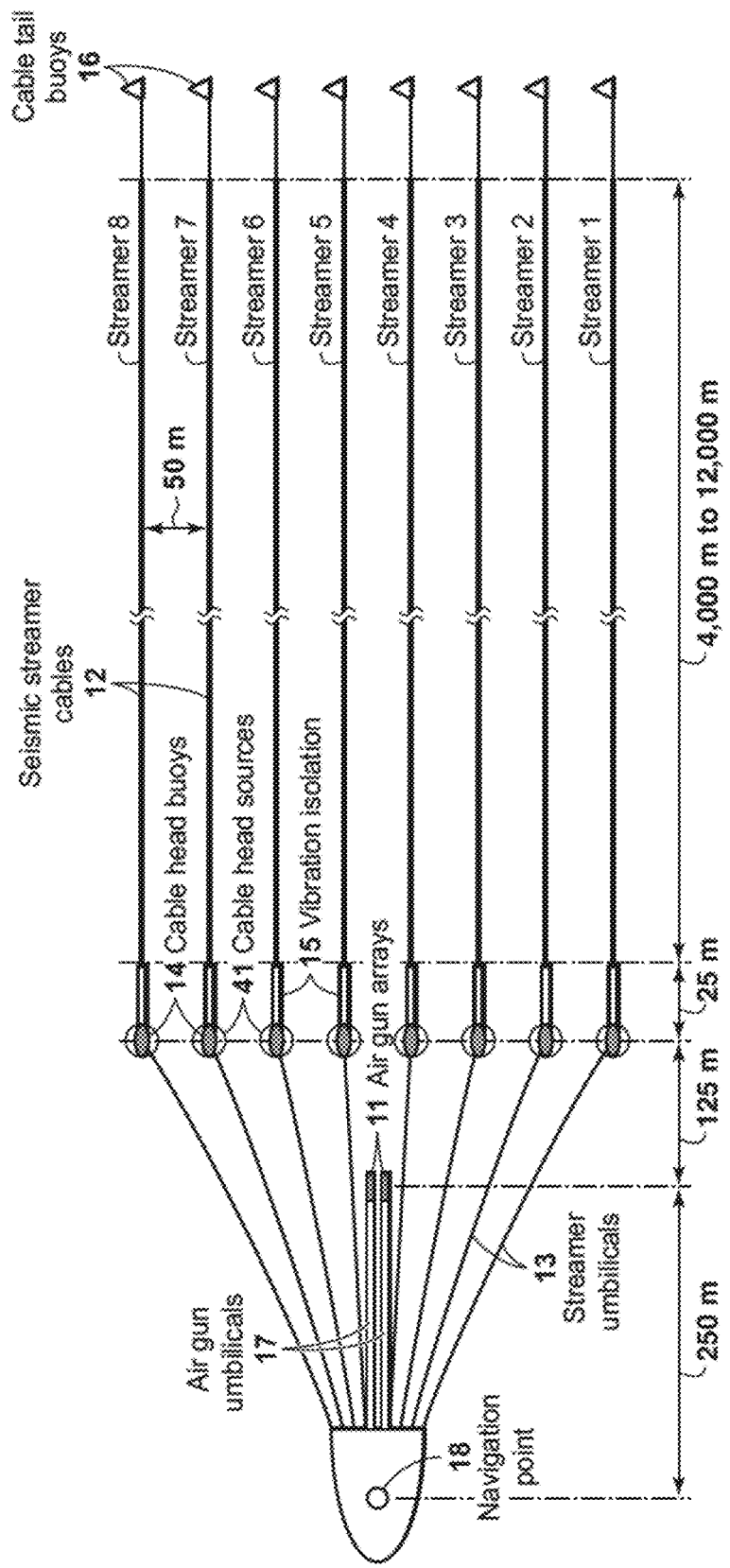
FIG. 4 is a schematic plan view of in-sea 3D, marine seismic hardware using a Cable Head Source of the present invention at the head of each streamer.
Figure 5:
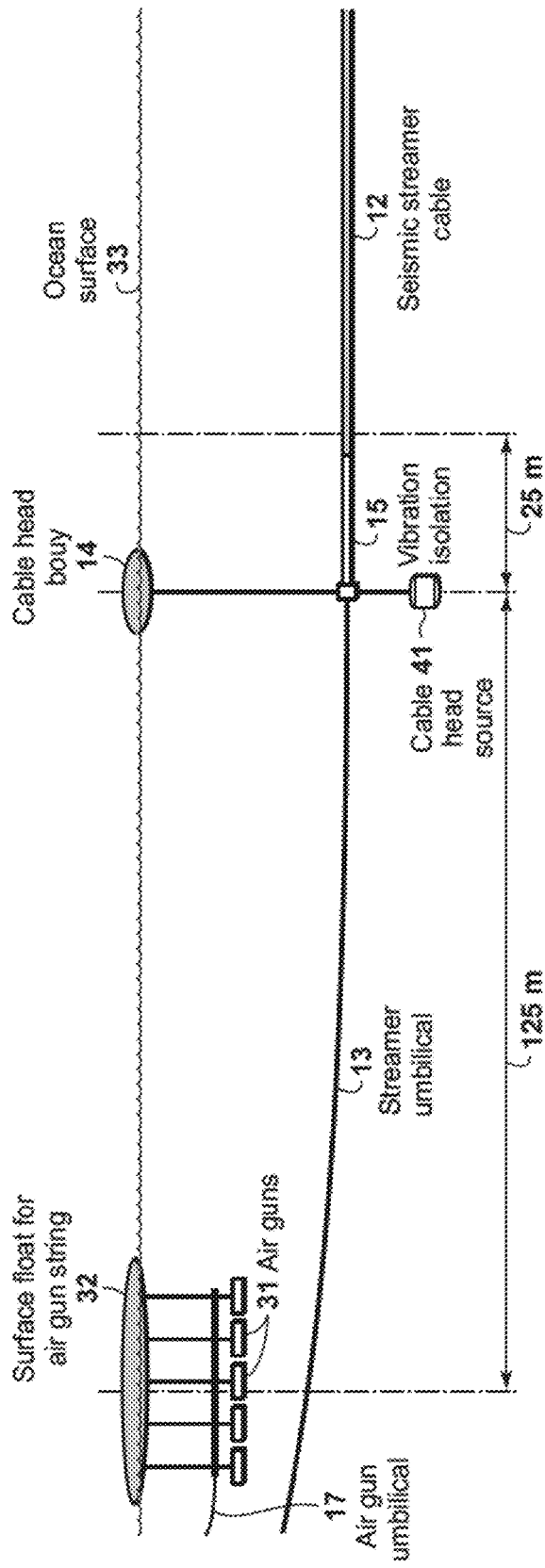
FIG. 5 is a schematic cross-section view of in-sea marine seismic hardware using a Cable Head Source of the present invention.

FIGS. 4 and 5 are schematic representations of the plan and cross-section views of a hardware layout for 3D, marine, seismic acquisition employing Cable Head Sources at the head of each streamer. Although a 3D survey is shown for purposes of illustration, the invention works equally well for a 2D survey. In FIG. 5, the Cable Head Source is located below the streamer. This location is convenient from an operational and deployment standpoint. Alternatively, the Cable Head Source can be located at any location where the weight of the acoustic transmitter is supported by the cable head buoy, i.e. between the cable head buoy and the streamer. To explain in more detail, normally there is a rope or chain that is attached at one end to the bottom of the cable head buoy, and the other end is attached to the streamer cable where the streamer's umbilical attaches to the streamer. For operational reasons, it would be easier to attach the Cable Head Source to the streamer so the Cable Head Source would be physically suspended below the streamer. Alternate deployments are possible, for example using two pieces of chain or rope in the following manner The first chain or rope extends from the bottom of the cable head buoy to the Cable Head Source and the second chain or rope goes from the bottom of the Cable Head Source to the streamer. In this alternate deployment, the Cable Head Source is physically located between the cable head buoy and the streamer.

The availability of sufficient buoyancy is an important reason for placing the acoustic transmitter at the cable head buoy. An acoustic transmitter used to penetrate several hundred meters into the subsurface is inherently a relatively large device and is inherently heavy. For example, the aforementioned Bubble Gun weighs more than 300 pounds. Consequently the acoustic transmitter needs to be placed at a location in the streamer cable that provides sufficient buoyancy to support the acoustic transmitter and at a location with sufficient vibration isolation to isolate the sensor sets in the streamer cable from the motion induced by the acoustic transmitter. The vibration isolation module(s) sit aft of the connection point between the umbilical and the streamer. There is a cable head connector that mechanically and electrically connects the umbilical to the streamer. The cable head connector is where the rope or chain from the cable head buoy typically is mechanically attached to the umbilical-streamer. Since the connection point is forward of the vibration module, it does not matter whether the Cable Head Source is attached above or below the streamer. Either location mechanically isolates the Cable Head Source from the sensor sets in the streamer.

Schematically, the Cable Head Source is shown being powered and controlled via the streamer's umbilical which is logistically and operationally the best option, but it is possible to power and control a Cable Head Source with a separate umbilical that is independent of the streamer's umbilical.

Some marine seismic acquisition systems provide single sensors near the transition from the umbilical to the streamer. These sensors are typically referred to as waterbreak channels whose primary purpose is to locate the head of the streamer. When a Cable Head Source is deployed at the head of the cable, the waterbreak sensor(s) can be used to acquire zero-offset data and the sensor sets in the streamer can be used to acquire near-offset data. The zero-offset data provide the best timing estimates and the least phase uncertainty for reflection events and the associated multiple events. For near-offset data in shallow water, the errors associated with event timing estimates and phase uncertainty are increased with respect to the zero-offset data but are still significantly smaller than the corresponding errors associated with the air guns and the streamer data.

Figure 6:
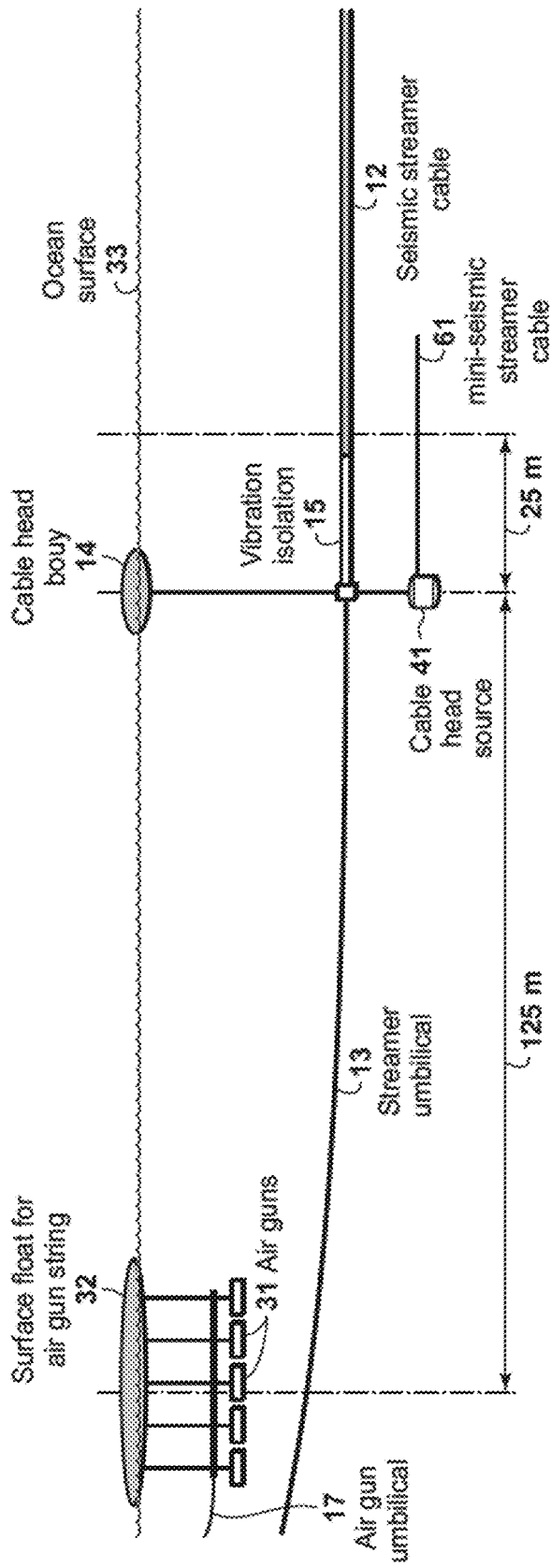
FIG. 6 is a schematic cross-section view of in-sea marine seismic hardware using a Cable Head Source with an integrated mini-seismic streamer cable.

To improve the quality of the near-offset data, a mini-streamer 61 can be associated with each Cable Head Source. This configuration is shown in FIG. 6. In this configuration, a Cable Head Source provides zero-offset data and near zero-offset data. The near zero-offset data allows for signal-to-noise improvement via well-known seismic data processing techniques and also provides information about the near-surface velocity structure. Having the length of the mini-streamer be two to three times the distance between the Cable Head Source and the first active streamer sensor set allows a direct tie to be made between the mini-streamer data and the data from the associated seismic streamer.

In the foregoing description, the Cable Head Source is located at the streamer head. From an operational and logistical standpoint, the head of each streamer is the optimal location because of the availability of additional electrical power, the vibration isolation provided for the sensor sets in the streamer and the buoyancy provided by the cable head buoy. With the addition of sufficient additional buoyance, power and vibration isolation for the streamer sensor sets, a Cable Head Source could be located at the tail buoy that is typically associated with each streamer.

During the acquisition of seismic data, the Cable Head Source(s) can be operated in many ways. Three example embodiments of the invention are presented in FIGS. 7A-7C. The difference between the embodiments is in the firing of the Cable Head Sources, as shown in steps 71, 72 and 73. In the embodiment of FIG. 7A, the Cable Head Sources (one for each streamer) are fired sequentially with a predetermined time delay between the firing of successive Cable Head Sources. The predetermined delay time might be based on the expected depth of penetration with typical record durations of 200 to 300 milliseconds. Embodiment 7B reduces the total time required to fire all of the Cable Head Sources by firing two or more Cable Head Sources simultaneously. An example of this patterned firing would be to fire the Cable Head Sources for streamers 1 and 5, then for streamers 2 and 6, then for streamers 3 and 7 and finally for streamers 4 and 8. This pattern would reduce the total time required for the Cable Head Sources to be fired to half the time needed by embodiment 7A. Interference between the individual Cable Head Sources would be minimized due to the limited duration of the seismic records associated with the Cable Head Sources and the crossline spacing between the Cable Head Sources that are being fired simultaneously. In appropriate geologic settings, embodiment 7C could be used. In this mode, all of the Cable Head Sources are fired simultaneously and the individual records separated based on apparent moveout.

Firing the Cable Head Sources before the air gun array(s) are fired is not essential but may be advantageous because the weak Cable Head Sources will then be fired when the residual energy from the previous air gun shot is small. The Cable Head Sources could be fired at the end of the seismic record for the air gun sources, but doing so would increase the effective noise floor of the Cable Head Source records. This increase in the noise level would limit the depth of penetration realized by the Cable Head Sources.

Since the near-surface geology that is sampled by the Cable Head sources is expected to have greater lateral variability than the geology at the reservoir level, there is potential value in firing the Cable Head Sources at a higher rate than the firing rate used for the air gun source arrays. As with the previously noted option of firing the Cable Head Sources at the end of the seismic record, firing the Cable Head Sources at a higher rate than the air gun source arrays are fired would increase the noise level. The increased noise level can potentially be mitigated by applying well known geophysical signal process algorithms that enhance signal to noise by exploiting the differences in the pulse shape, frequency content and move-out characteristics of the air gun sources and the Cable Head Sources. The Cable Head Source shooting patterns detailed in FIGS. 7A, 7B and 7C would be applicable to firing the individual Cable Head Sources at a higher rate than the firing rate used for the air gun sources.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

The invention claimed is:

1. A method for acquiring near zero-offset seismic data said method comprising:
    towing a seismic source array and a plurality of streamers in a 3D survey configuration,
    wherein the plurality of streamers are towed separately from the seismic source array, the 3D survey configuration includes a plurality of acoustic transmitters, a separate acoustic transmitter, relative to the seismic source array, of the plurality of acoustic transmitters, is suspended below a head or tail of each of the plurality of streamers, and each of the plurality of streamers and the acoustic transmitter corresponding thereto are suspended from a buoy;
    firing at least one of the plurality of acoustic transmitters, wherein the firing causes an acoustic signal to penetrate beneath the water bottom at least 300 m into earth's subsurface; and
    obtaining the near zero-offset seismic data from one or more streamer sensors nearest the at least one of the plurality of acoustic transmitters, wherein the streamer sensors record a reflection of the acoustic signal from a structure in the earth's subsurface.

2. The method of claim 1, wherein said buoy is a head buoy that provides flotation where a streamer of the plurality of streamers connects to a tow umbilical.

3. The method of claim 2, wherein said head buoy has flotation sufficient for the weight of the tow umbilical, the streamer of the plurality of streamers, and the acoustic transmitter suspended therefrom.

4. The method of claim 2, further comprising providing electrical power and signal connections to the head buoy via the tow umbilical.

5. The method of claim 2, wherein each of the plurality of streamers includes a plurality of seismic sensor groups located sequentially along each of the plurality of streamers, and the method further comprises recording reflected data with a sensor group nearest the tow umbilical that is laterally no more than 50 m from the at least one of the plurality of acoustic transmitters and head buoy.

6. The method of claim 5, further comprising recording data with a streamer of seismic sensors that are attached to at least one of the plurality of acoustic transmitters to obtain even nearer-offset data than is provided by said sensor group nearest the umbilical.

7. The method of claim 1, further comprising firing the seismic source array at a predetermined time interval after completion of the firing of at least one of the plurality of acoustic transmitters.

8. The method of claim 7, further comprising firing at least two acoustic transmitters of the plurality of acoustic transmitters sequentially.

9. The method of claim 7, wherein the 3D survey configuration has at least four streamers, at least four of which have an acoustic transmitter of the plurality of acoustic transmitters, and the method further comprising firing the at least four acoustic transmitters sequentially in groupings of N at a time, where integer N>1.

10. The method of claim 7, further comprising firing at least two acoustic transmitters of the plurality of acoustic transmitters simultaneously.

11. The method of claim 1, wherein the firing of the at least one of the plurality of acoustic transmitters, paired with a firing of the seismic source array, occurs repeatedly while being towed along a selected source line.

12. The method of claim 11, wherein the seismic source array is fired no more than 500 ms after the firing of the at least one of the plurality of acoustic transmitters is completed.

13. The method of claim 1, wherein said buoy comprises a head buoy attached to a near end of at least one of the plurality of streamers and a tail buoy attached to a far end of the at least one of the plurality of streamers, and the at least one of the plurality of acoustic transmitters is disposed at the tail buoy.

14. The method of claim 1, further comprising recording data with waterbreak sensors attached to each of the streamers where each of the streamers connects to a tow umbilical, and generating zero-offset information from data recorded by the waterbreak sensors.

15. A marine seismic surveying system comprising:
    a seismic source array with a first umbilical cable for towing and electrical connections;
    a plurality of streamers with a second umbilical cable for towing and electrical connections, the plurality of streamers including seismic sensors distributed along a length of each of the plurality of streamers, wherein the seismic sensors are configured to record a reflection of an acoustic signal from a subsurface structure, and the plurality of streamers are configured for a 3D survey;
    a plurality buoys, one for each of the plurality of streamers, that provide flotation for the plurality of streamers and the second umbilical; and
    a plurality of acoustic transmitters, wherein a separate acoustic transmitter, relative to the seismic source array, of the plurality of acoustic transmitters, is configured to be suspended below a head or tail of each of the plurality of streamers, and each of the plurality of streamers and the acoustic transmitter corresponding thereto are configured to be suspended from a buoy of the plurality of buoys, wherein each of the plurality of acoustic transmitters are configured to emit an acoustic signal that penetrates beneath a water bottom at least 300 m into earth's subsurface and reflects back to the seismic sensors, wherein, in operation, a lateral distance between the seismic source array and a closer end of any streamer is greater than a lateral distance between any buoy and a closer end of its corresponding streamer.

16. The system of claim 15, wherein the lateral distance between the seismic source array and a closer end of any streamer is at least five times greater than the lateral distance between any buoy and a closer end of its corresponding streamer.

17. The system of claim 15, wherein the acoustic transmitters each weight less than 1,000 lbs.

18. The system of claim 15, wherein each of the plurality of the acoustic transmitters transmits an acoustic signal with a peak amplitude greater than 300 millibars in a frequency band from 10 to 2000 Hz.

* * * * *